(12) United States Patent
Bhuyan (10) Patent No.: US 7,158,998 B2
(45) Date of Patent: Jan. 2, 2007

(54) EFFICIENT SYNCHRONOUS AND ASYNCHRONOUS DATABASE REPLICATION

(75) Inventor: Krishna M. Bhuyan, Redmond, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 320 days.

(21) Appl. No.: 10/209,754

(22) Filed: Jul. 31, 2002

(65) Prior Publication Data

US 2004/0034670 A1   Feb. 19, 2004

(51) Int. Cl.
*G06F 17/30* (2006.01)

(52) U.S. Cl. .................. 707/201; 707/203; 707/204

(58) Field of Classification Search ............ 707/1–10, 707/100–104.1, 200–206; 711/162; 114/6, 114/16.4
See application file for complete search history.

(56) References Cited

U.S. PATENT DOCUMENTS

| | | | | |
|---|---|---|---|---|
| 5,937,414 A | * | 8/1999 | Souder et al. | 707/203 |
| 5,951,695 A | * | 9/1999 | Kolovson | 714/16 |
| 6,163,856 A | * | 12/2000 | Dion et al. | 714/4 |
| 6,260,124 B1 | * | 7/2001 | Crockett et al. | 711/162 |
| 6,622,152 B1 | * | 9/2003 | Sinn et al. | 707/204 |
| 6,691,245 B1 | * | 2/2004 | DeKoning | 714/6 |
| 6,772,363 B1 | * | 8/2004 | Pedone et al. | 714/4 |

* cited by examiner

*Primary Examiner*—Jeffrey Gaffin
*Assistant Examiner*—Yicun Wu
(74) *Attorney, Agent, or Firm*—Klarquist Sparkman, LLP (57) ABSTRACT

A put transaction is intercepted and communicated from an application to a database driver. The transaction is committed to a target database of the transaction and a backup database of the target database when both the target database and the backup database are available. When one of the target database and the backup database is an unavailable database, the transaction is recorded in a file. When the unavailable database becomes an available database, the transaction is committed to the available database.

20 Claims, 10 Drawing Sheets

EFFICIENT SYNCHRONOUS AND ASYNCHRONOUS DATABASE REPLICATION

TECHNICAL FIELD

The invention relates to computer databases, and more particularly to computer database replication.

BACKGROUND

A database is any collection of information (data), typically structured so as to be searchable by one or more criteria. Database replication involves duplicating the data found in a first database to at least one other database, so that in the event the first database is corrupted, inaccessible, or destroyed, one of the other databases may operate as a replacement. The first database is referred to as the primary database, and the other databases may be referred to as backup databases.

Database replication is characterized by coherency, availability, and load balance. Two databases are said to be highly coherent when changes to one are quickly reflected into the other. The longer it takes for changes to one database to be reflected into the other, the less coherent the databases. A database is said to be highly available when attempts to access the data for reading and writing are successful a large majority of the time. The more often an access to a database fails, the less accessible the database. Load balancing is the process of balancing read/write accesses among multiple replicated databases. Two or more databases are said to be highly balanced when each experiences approximately the same number of accesses per unit time as each of the others.

Database replication may be performed synchronously or asynchronously. Synchronous replication involves replication that takes place closely in time with the transaction that is replicated. For example, if a write transaction is made to a first database and the data that was written is then replicated to a second database a few milliseconds later, the replication would typically be considered synchronous. Synchronous replication typically offers higher coherency, but lower availability, due to the fact that all of the backup databases incur the overhead of each individual write transaction to the primary database. Asynchronous replication typically involves a greater time delay between transactions to the primary database and replication to the backup databases. Transactions may be replicated in batches, so that the backup databases do not incur the overhead of every write transaction to the primary databases. Asynchronous replication offers higher availability at the expense of coherency.

Existing database replication methods include storage-level replication, database-level replication, and application-level replication. Storage-level replication involves actions to replicate the database by the device that stores the database information. Such devices may include intelligent disk arrays. Database-level replication involves actions to replicate the database by the database software that manages the database information. Such applications and produced and sold by such companies as Oracle, IBM, and Microsoft. Application-level replication involves actions to replicate the database by applications that access and/or operate upon the database information. Conventional replication techniques at the storage, database, and application level are either synchronous or asynchronous, but not both. Thus, the advantages of synchronous replication may be lost in situations where asynchronous replication is employed but where synchronous replication would be more advantageous. Likewise, the advantages of asynchronous replication may be lost in situations where synchronous replication is employed but where asynchronous replication would be more advantageous.

SUMMARY

A put transaction is intercepted and communicated from an application to a database driver. The transaction is committed to a target database of the transaction and a backup database of the target database when both the target database and the backup database are available. When one of the target database and the backup database is an unavailable database, the transaction is recorded in a file. When the unavailable database becomes an available database, the transaction is committed to the available database.

DESCRIPTION

In the following figures and description, like numbers refer to like elements. References to "one embodiment" or "an embodiment" do not necessarily refer to the same embodiment, although they may. In the figures, like numbers refer to like elements.

Figure 1:
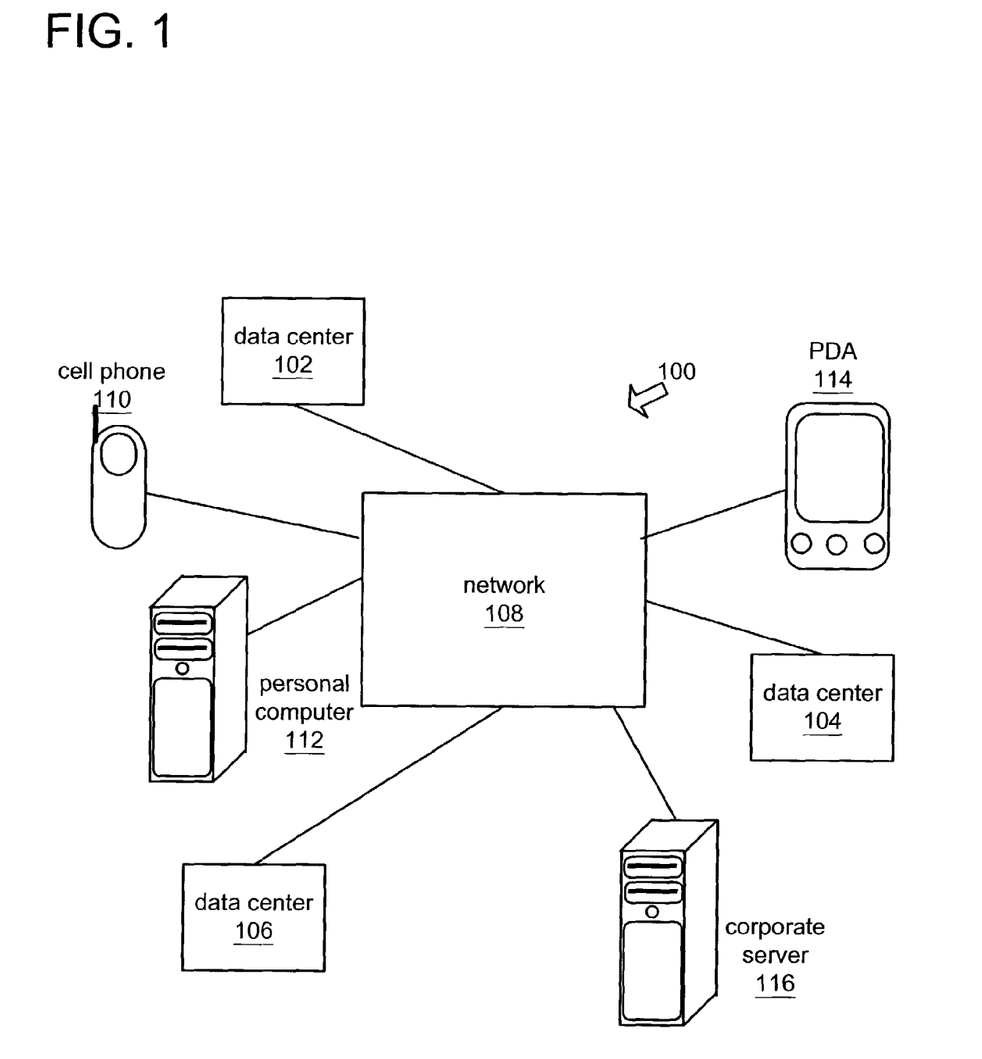
FIG. 1 is a block diagram of an embodiment of distributed networked data centers.

With reference to FIG. 1, an embodiment 100 of a distributed data center includes data centers 102, 104, and 106 communicating by way of a network 108. A 'data center' is any co-located collection of computing and storage systems. A computing system is any device comprising a processor and memory to store instructions and data for execution and manipulation, respectively, by the processor. A storage system is any device comprising memory to store data, such as the data of databases. Co-located devices are located within the same general geographic area, typically within the same building. A network is a collection of equipment coupled to exchange signals comprising data and instructions. Examples of network equipment are public telephone exchanges, wireless base stations, Internet servers, routers, personal computers, and switches.

The data centers cooperate to implement a network service, such as a high-volume Internet portal application. For example, AT&T Wireless Services operates a portal web site comprising multiple cooperating data centers. The portal operates as a home site for subscribers of AT&T Wireless Services that operate wireless phones with Internet browsing capability.

Devices 110 (a cell phone), 112 (a personal computer), 114 (a personal digital assistant), and 118 (a corporate server) may access the network service of the data centers via the network 108.

Figure 2:
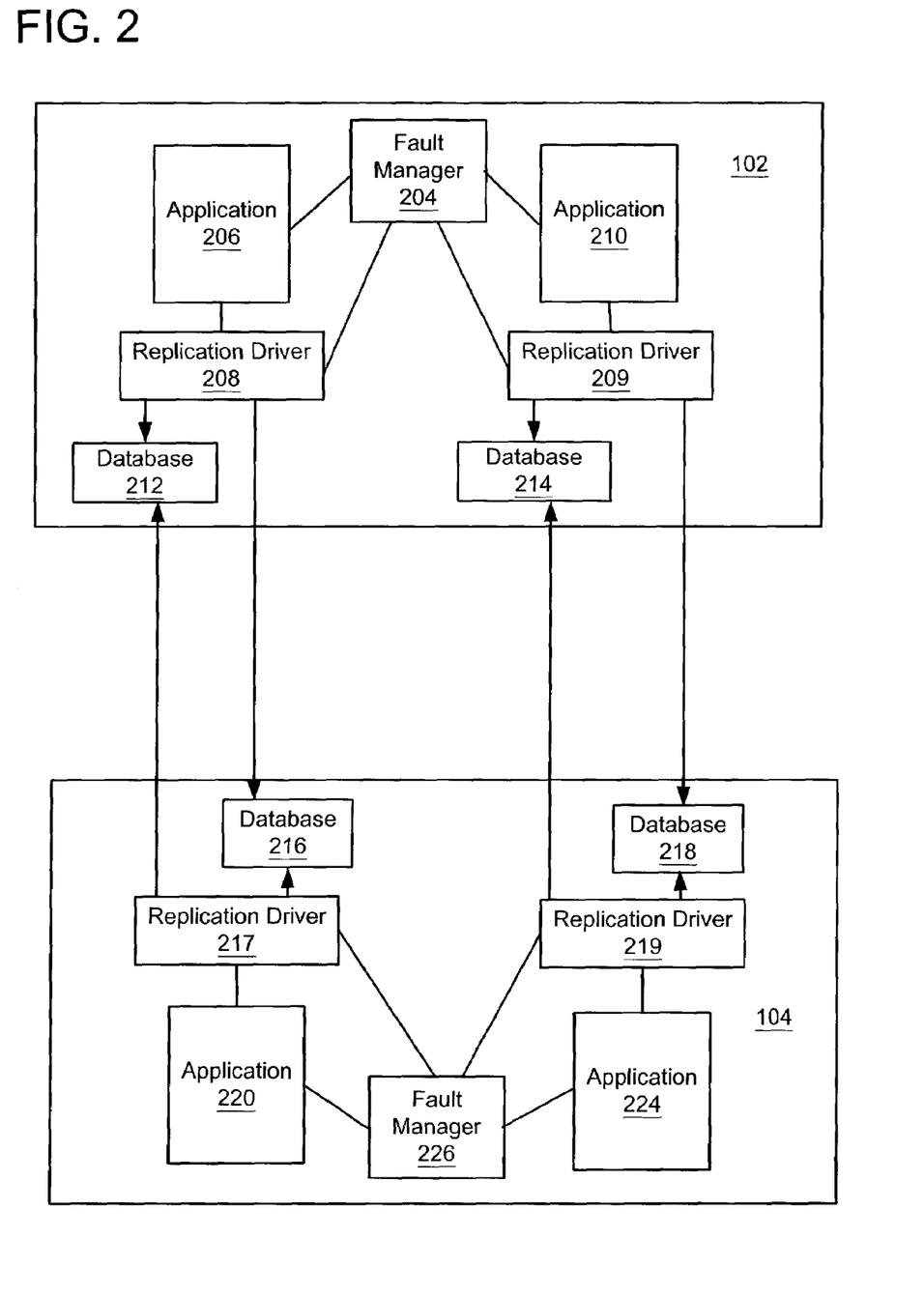
FIG. 2 is a block diagram of embodiments of the data centers of FIG. 1.

A more detailed block diagram of two data centers 102, 104 is shown in FIG. 2. The two data centers exchange signals via the network 108, which is not shown again for purposes of simplicity. The first data center 102 comprises software applications (programs) 206, 210 and databases 212, 214. Together, the applications and the databases implement the network service. In FIG. 2, a line between an application and a database indicates communication of transactions between the application and the database. The second data center 104 also comprises software applications 220, 224 and databases 216, 218. Each application may provide query and put transactions to a 'primary' database, e.g. the one database to which the application is configured to direct database transactions. The database that a transaction is directed to is the target database of the transaction. The data in each local database is replicated to a backup database. A database co-located with an application is referred to as a 'local database' with respect to the application. A database not co-located with an application is a remote database with respect to the application. The backup database can be either local or remote.

The applications 206, 210 interact with the their primary and backup databases by way of replication drivers 208, 209 respectively. The applications 220, 224 interact with the their primary and backup databases by way of replication drivers 217, 219 respectively. The purpose and function of the replication drivers is explained more fully in conjunction with FIG. 4.

Each data center also comprises a fault manager 204, 226 that is responsible for helping to maintain the fault tolerance of the data centers 102, 104. The fault managers 204, 226 monitor applications (applications 206, 210 and 220, 224, respectively) in the data center that comprises them, to detect when an application fails (e.g. stops executing or executes incorrectly). Each data center 102, 104 may comprise multiple fault managers operating in a redundant roll-over fashion to increase availability and fault tolerance, in a manner to be described.

Figure 3:
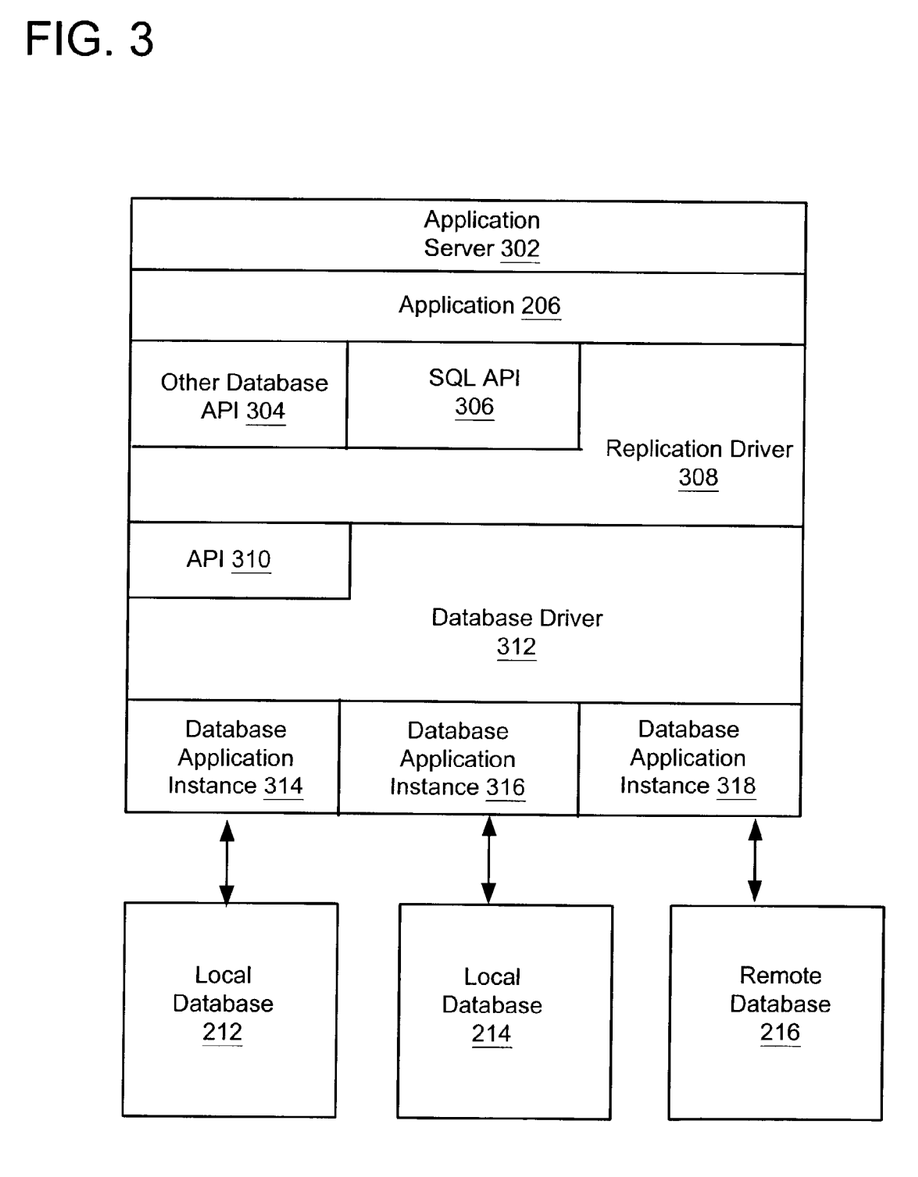
FIG. 3 is an illustration of an embodiment of functional layers in a data center.

With reference to FIG. 3, the network service provided by an application 206 may be made available via the network 108 using an application server 302. The application server acts as an interface for devices 110, 112, 114, 116 to access the functionality of the application 206 (e.g. to access the network service) via the network 108. The application 206 is assigned a primary database 212 to which it directs read and write transactions. The application 206 interacts with its primary database 212 via various logic components. These logic components include a database application instance 314, a database driver 312, and a replication driver 308. Other logic components that may play a role include various components that implement Application Programming Interfaces (APIs), such as a database API component 304, Structured Query Language (SQL) component 306, and API component 310. Typically, the logic components, application 206, and application server 302 are implemented as software executing on a general purpose computing platform. However, it is also possible that combinations of hardware, software, firmware, and the like could be used to implement the application 206, application server 302, and logic components. Of course, many other components not relevant to the present discussion may also be present in a particular data center.

In one embodiment, the application 206 interacts with the replication driver 308 using the Structured Query Language for Java (SQL-J) API to invoke SQL statements on the database. The application 206 may also invoke the Enterprise Java Bean (EJB) API to interact with the replication driver 308. In one embodiment, the replication driver:

1. Monitors the availability of multiple databases.
2. Manages connections to multiple local and remote databases.
3. Adaptively provides synchronous and asynchronous database replication.
4. Intercepts database transactions (queries and puts) communicated from the application 206 to the database driver 312.

The database driver 312 translates database transactions from the application 206 into commands to the database application instances 314, 316, 318. Each database application instance searches, organizes, and otherwise operates upon one or more of the local and remote databases 212, 214, 216 to carry out the transactions from the application 206. Herein, an "instance" is a set of instructions having its own unique operating environment, e.g. its own data and configuration. Each database application instance therefore comprises substantially similar sets of instructions but different values of its data variables.

The replication driver 308 may present the application with an interface identical to the interface provided by the database driver 312. In other words, the replication driver 308 may appear identical to the database driver 312 from the application 206 perspective. When the application 206 is originally designed to interoperate with the database driver 312, no alterations to the application 206 need be made in order for the application 206 to interoperate with the replication driver 308 instead.

The replication driver 308 may communicate with the other local databases 212, 214 and the remote database 216 for purposes of performing replication, in manners to be described. Communication with the database 214 may be accomplished by way of the database application instance 316. Communication with the database 216 may be accomplished by way of the database application instance 318.

In one embodiment, the application 206 communicates read transactions (queries) and write transactions (puts) to the primary database 212. Puts typically include data to write to the database 212. Data is returned from the database 212 to the application 206 in response to successful queries. Put and query instructions are provided by the application 206 by way of method calls to the replication driver 308. The SQL API implementation 306, or another database API implementation 304, may be employed by the application 206 to provide queries and puts to the replication driver 308. The replication driver 308 provides the queries and puts by way of method calls to the database driver 312. Alternatively, the queries and puts may be provided to the database driver 312 by way of API implementation 310. The API 310 may be employed to coordinate distributed database transactions among multiple databases. The database driver 312 provides the queries and puts to the database application instance 314, which operates on the database 212 to fulfill the queries and puts. Data returned from queries is returned by the database application instance 314 to the database driver 312, which provides the return data to the replication driver 308 or API 310, which provides the data to the application 206, SQL API 306, or alter database API 304.

Display or other application of the returned data that the application 206 manifests to clients is provided to the application server 302, which provides these manifestations to the clients via the network 108.

Figure 4:
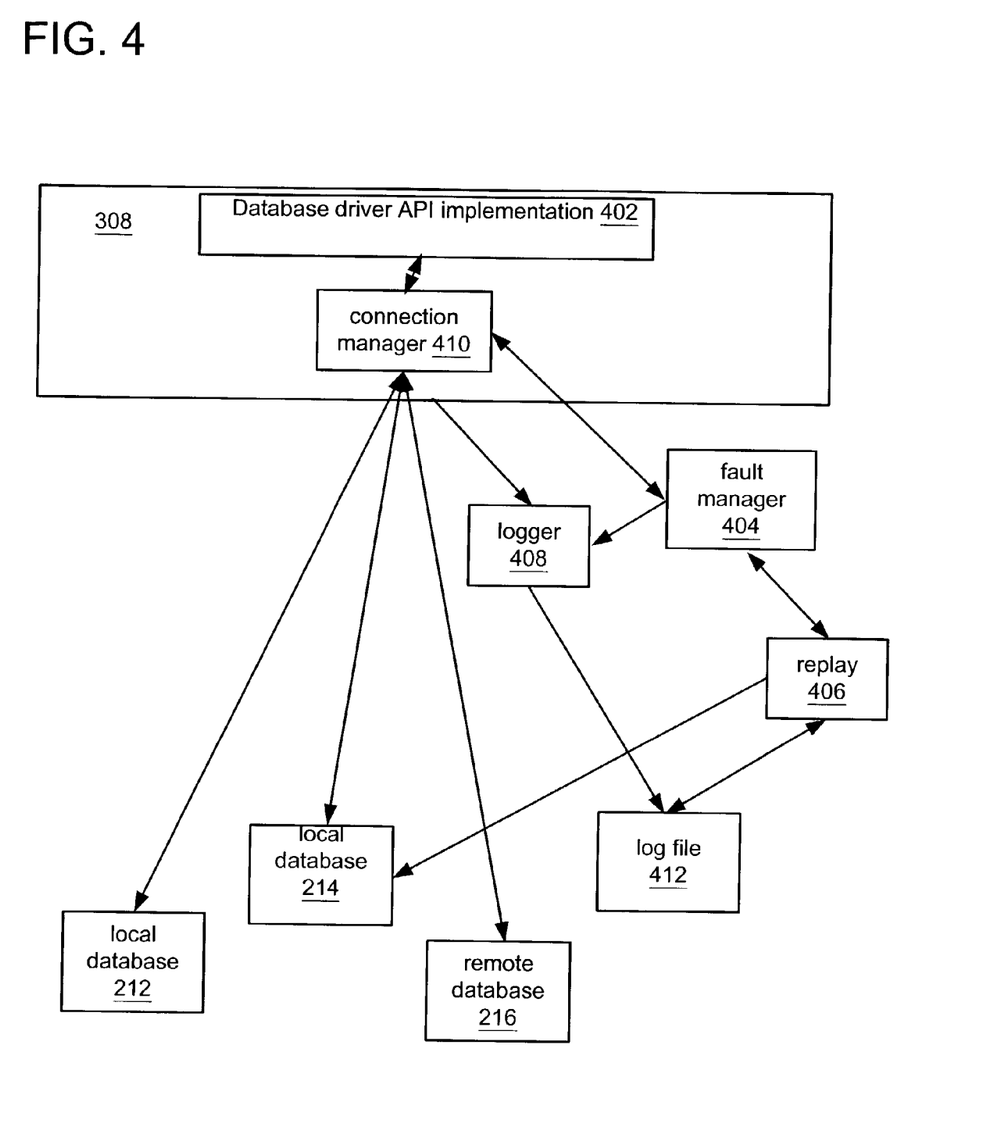
FIG. 4 is a block diagram of an embodiment of a replication driver.

FIG. 4 shows in more detail an embodiment of the replication driver 308. The replication driver 308 comprises an implementation of the data and methods for communicating with the database driver 312 (e.g. the replication driver 308 implements the database driver API 402, for example the Java Database Connectivity API). Thus, applications 206 designed to interact with the database driver 312 may instead without alteration interact with the replication driver 308.

The replication driver embodiment 308 comprises a connection manager component 410. Herein, 'component' means instructions and data to carry out the functionality attributed to the component and does not imply all such functionality need necessarily be comprised within a single identifiable piece, portion, or delineation of the replication driver. The connection manager maintains logical connections (the relevant variables, data structures, and state) to communicate with each database with which the replication driver 308 interacts.

The replication driver 308 also interacts with the fault manager 204, a replayer 406, and a logger 408. The fault manager 204 communicates with the connection manager 410 to detect when databases with which the replication driver 308 interacts become unavailable. The fault manager 204 communicates information received from the connection manager 410 concerning database unavailability to other connection managers of other replication drivers of the data center.

The logger 408 and the replayer 406 may also communicate with the fault manager 204 to ascertain when a database becomes unavailable. The logger 408 logs to a log file 412 transactions to unavailable databases received via the API implementation 402. The replayer 406 applies transactions stored in the log file to databases that become available after being unavailable. In one embodiment, one data file is shared among all applications of the data center. The API implementation 402 and the replayer 406 communicate queries and puts to the databases 212, 214, 216 via the connection manager 410.

Figure 5:
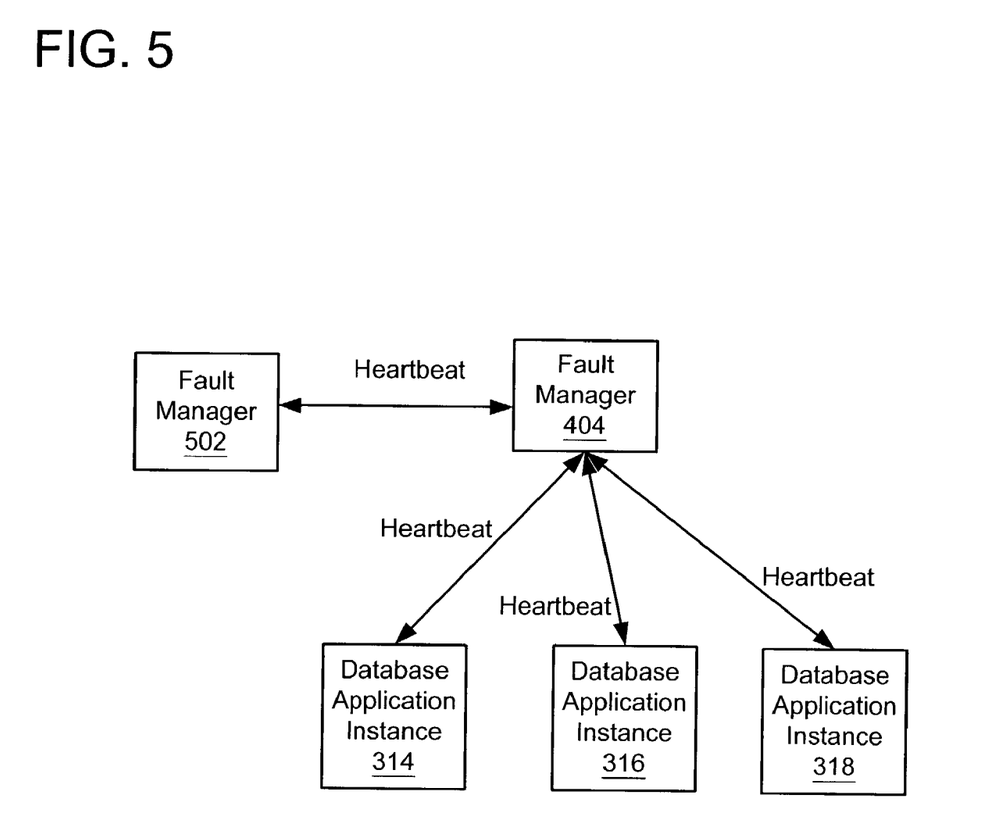
FIG. 5 is a block diagram of an embodiment of a fault manager arrangement.

FIG. 5 shows an embodiment of fault manager arrangement. A first fault manager 204 maintains periodic communication with all database application instances 314, 316, and 318 with which the replication driver may interact. Should one of the database application instances 314, 316, 318 fail to respond to a periodic communication from the first fault manager 204, the first fault manager 204 treats the unresponsive database instance as unavailable, until such time as the unresponsive database instance resumes response. The first fault manager 204 maintains periodic communication with a second fault manager 502 a different replication driver than the one comprising the first fault manager 204. Should the second fault manager 502 lose communication with the first fault manager 204, the second fault manager 502 will attempt to establish periodic communication with the database application instances 314, 316, 318. Thus the failure of the first fault manager 204 will not lead to an overall system failure. In one embodiment, the logger 408, replayer 406, and connection manager 410 may communicate with the fault manager 204 via a TCP/IP communication channel.

Figure 6:
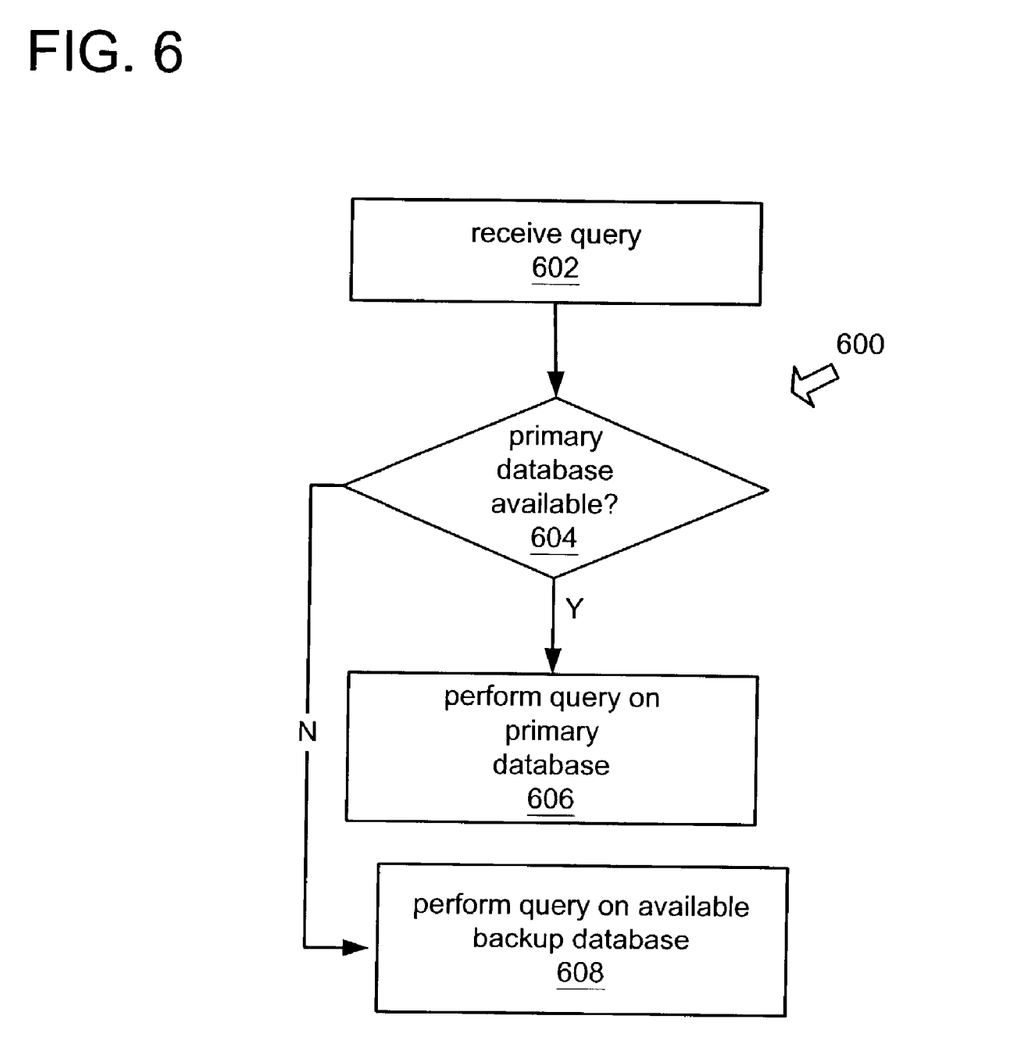
FIG. 6 is a flow chart of an embodiment of a method to query a database.

FIG. 6 shows a flow chart of an embodiment 600 of a method to query a database. A query is received at 602. At 604 it is determined whether the primary database for the application that provided the query is available. If it is, the query is performed on the primary database at 606. If not, the query is performed on one of the available replicated (backup) databases at 608.

Figure 7:
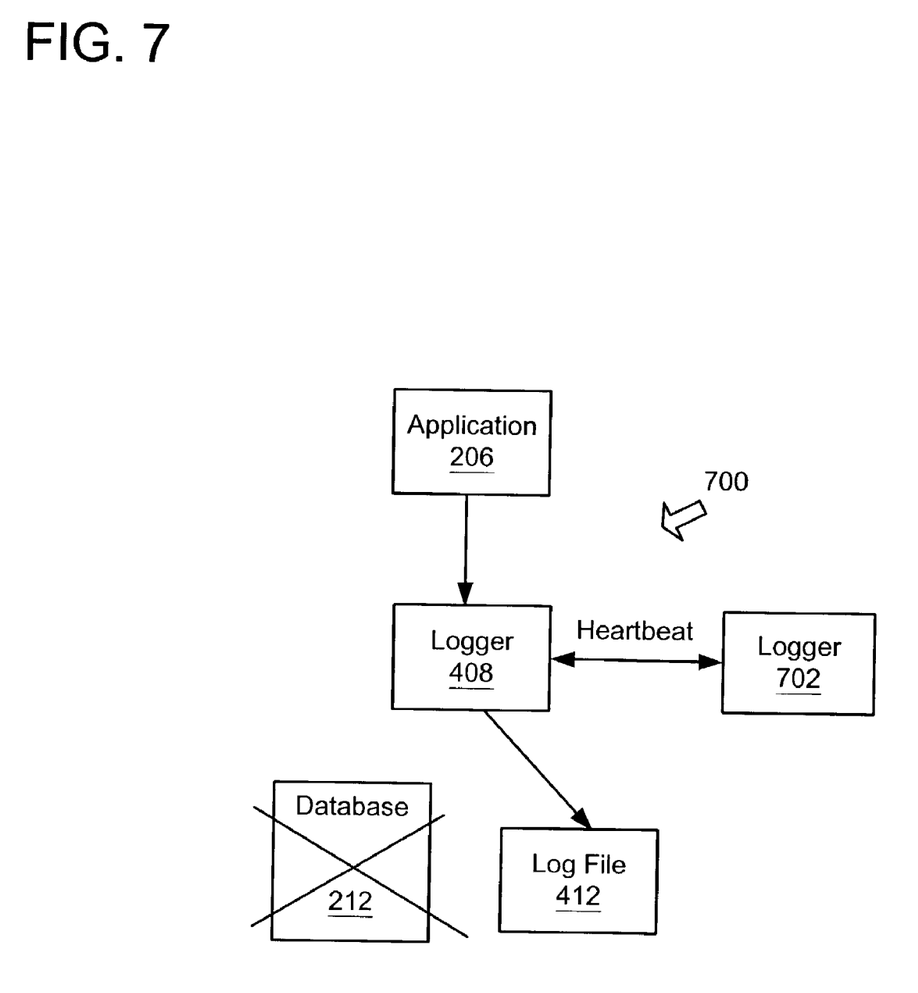
FIG. 7 is a block diagram of an embodiment of a transaction logger arrangement.

FIG. 7 shows an embodiment of a transaction logger arrangement. The application 206 communicates a put transaction to a first transaction logger 408. When the application's primary database 212 is unavailable, the transaction logger 408 records the put transaction to the log file 412. In one embodiment, when the backup database is unavailable the transaction is committed to the primary database and also logged, so that it may be replayed to the backup database once the backup database becomes available. Thus, synchronous replication to the backup database is performed when the primary and backup databases are available. When either is unavailable, asynchronous replication by way of the log file is selected. The first transaction logger 408 maintains periodic communication with a second transaction logger 702 of a different replication driver than the one comprising the first transaction logger 408. Should the second transaction logger 702 lose periodic communication with the first transaction logger 408, the second transaction logger 702 will take over the logging functions of the first transaction logger 408. In one embodiment, once the second logger 702 determines that the first logger 408 is no longer in communication, the second logger 702 may send a fault notification to the fault manager 204. The fault notification is communicated to the connection managers of other replication drivers. The other replication drivers then route transactions to the second data logger 702 for logging. Put transactions from the application 206 are then received by the second transaction logger 702 and recorded to the log file 412 when the application's primary database 212 is unavailable. Reliability is improved because should the first transaction logger 408 fail, the system continues to log transactions.

Figure 8:
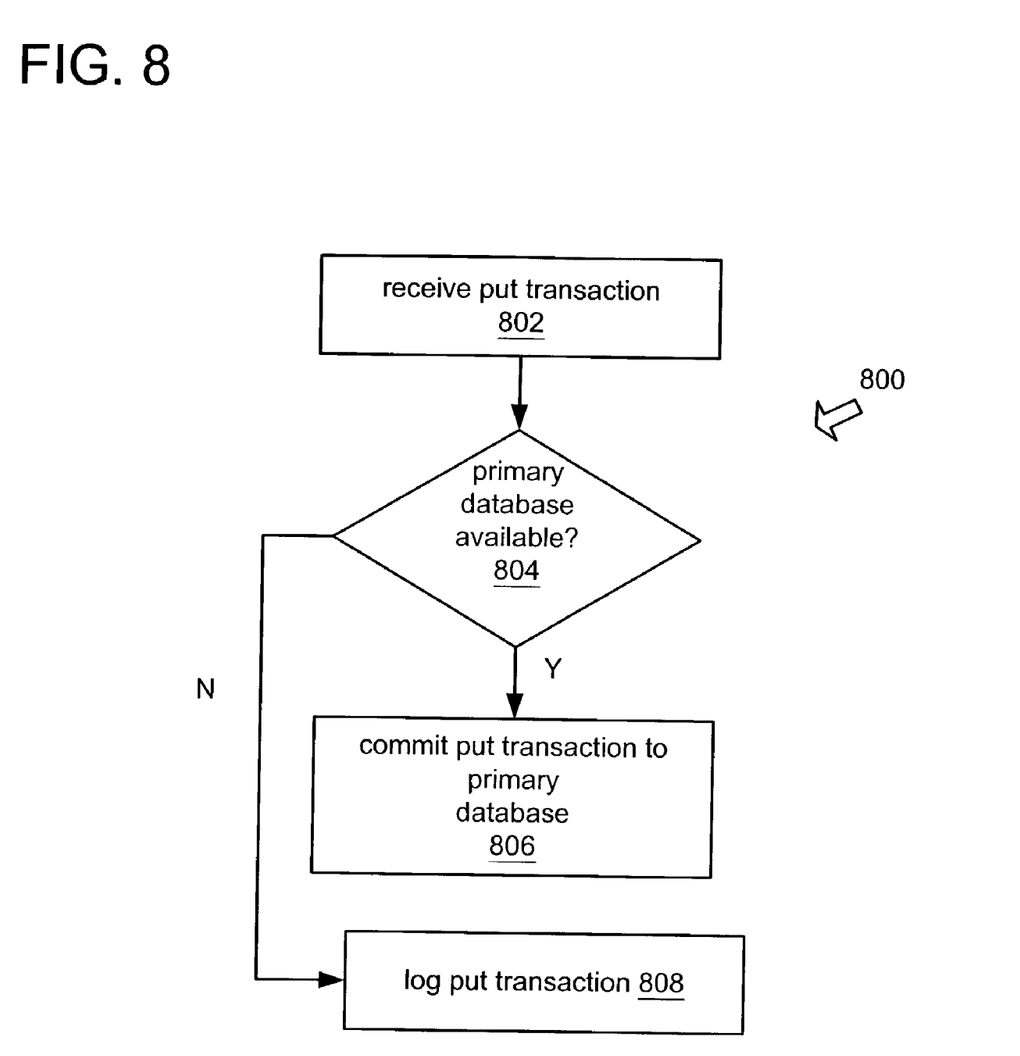
FIG. 8 is a flow chart of an embodiment of a method of handling put transactions.

FIG. 8 shows a flow chart of an embodiment 800 of a method of handling put transactions. A put transaction is received at 802. At 804 a check is made to determine whether the primary database for the application that provided the transaction is available. If so, the put transaction is committed to the primary database at 806. If the primary database is unavailable, the put transaction is logged to the log file at 808. Once a put transaction is committed to the database, the data from the transaction is part of the database and may affect the results of queries.

Figure 9:
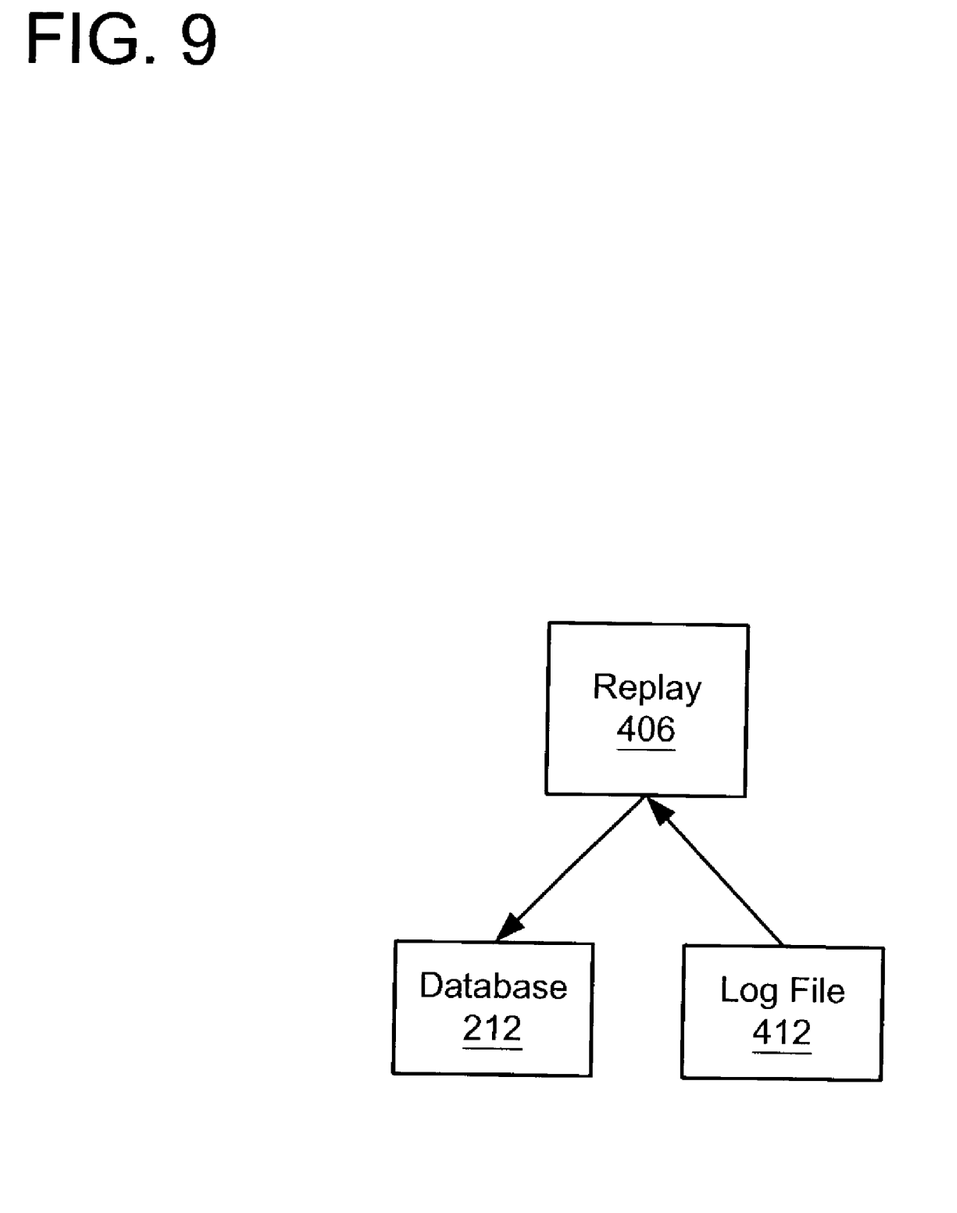
FIG. 9 is a block diagram of an embodiment of a replay arrangement.

FIG. 9 shows an embodiment of a replay (asynchronous replication) arrangement. When a previously unavailable database 212 become available, the replayer reads all recorded transactions from the log file 412 and commits the transactions to the database 212.

Figure 10:
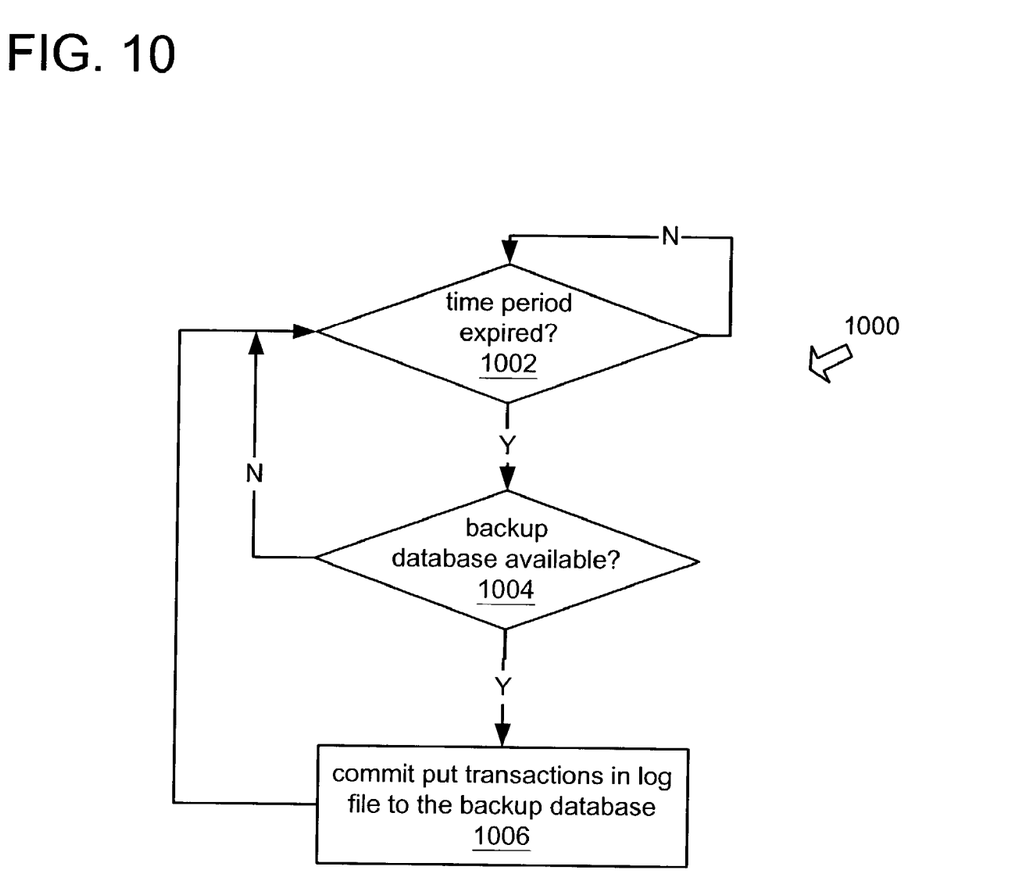
FIG. 10 is a flow chart of an embodiment of an asynchronous replication method.

FIG. 10 shows a flow chart of an embodiment 1000 of an asynchronous replication method. At 1002 it is determined whether a predetermined time period has expired. If so, it is next determined at 1004 whether a backup database has become available. If not, processing returns to 1002 to determine if the time period has expired. If so, put transactions recorded in the log file are committed to the backup database at 1006 and processing returns to 1002.

In view of the many possible embodiments to which the principles of the present invention may be applied, it should be recognized that the embodiments described herein are illustrative only and should not be taken as limiting in scope. Rather, the present invention encompasses all such embodiments as may come within the scope and spirit of the following claims and equivalents thereto.

What is claimed is:

1. A computer-implemented method comprising:
   intercepting a put transaction communicated from an application to a database driver;
   committing the transaction to a target database of the transaction and a backup database of the target database when both the target database and the backup database are available;
   determining whether one of the target database and the backup database is an unavailable database;
   maintaining communication between a first transaction logger and a second transaction logger independent of the availability of the target database and the backup database;
   recording the transaction in a file as a result of a determination that one of the target database and the backup database is an unavailable database, wherein the first transaction logger records the transaction if communication is maintained between the transaction loggers, and wherein the second transaction logger records the transaction if communication fails between the transaction loggers; and
   when the unavailable database becomes an available database, committing the transaction to the available database.

2. The method of claim 1 further comprising:
   directing queries to the backup database when the target database is unavailable.

3. The method of claim 1 further comprising:
   maintaining periodic communication with the target and backup databases using a first fault manager;
   the first fault manager communicating with a second fault manager; and
   the second fault manager starting periodic communication with the target and backup databases when communication between the first and second fault managers fails.

4. The method of claim 1 further comprising:
   when the unavailable database becomes an available database, reading logged transactions from the file and committing the logged transactions to the available database.

5. The method of claim 1 further comprising:
   the backup database being a remote database.

6. The method of claim 1, wherein the transaction is recorded in a file only if it is determined that one of the target database and the backup database is an unavailable database.

7. A system comprising:
   an application;
   a primary database of the application and a backup database;
   a first fault manager in periodic communication with the primary and backup databases and in periodic communication with a second fault manager, wherein the second fault manager starts periodic communication with the primary and backup databases when communication between the first and second fault managers fails;
   a database driver; and
   a replication driver to intercept communications between the application and the database driver;
   the replication driver causing a put transaction communicated from the application to be committed to the primary database and the backup database when both the primary and backup databases are available; and
   when one of the primary database and the backup database is determined to be an unavailable database, the replication driver causing the transaction to be recorded in a file as a result of the determination.

8. The system of claim 7 further comprising:
   a replayer, the replayer causing the transaction to commit to the available database when the unavailable database becomes an available database.

9. The system of claim 7 further comprising:
   a first transaction logger in periodic communication with a second transaction logger, the first transaction logger writing put transactions to the file when one of the primary database and the backup database is an unavailable database; and
   the second transaction logger writing the put transactions to the file when communication between the first and second loggers fails.

10. The system of claim 7 further comprising:
    the backup database being a remote database of the application.

11. The system of claim 7 further comprising:
    a first replayer to read logged transactions from the file and commit the logged transactions to the available database when the unavailable database becomes an available database.

12. A system comprising:
    a first data center comprising:
      a first fault manager;
      a first application and a second application;
      a first replication driver and a second replication driver; and
      a first database and a second database; and
    a second data center comprising:
      a second fault manager;
      a third application and a fourth application;
      a third replication driver and a fourth replication driver; and
      a third database and a fourth database, wherein the first fault manager monitors the first and second applications, wherein the second fault manager monitors the third and fourth applications, wherein the first database is a primary database for the first application and a backup database for the third application, wherein the second database is a primary database for the second application and a backup database for the fourth application, wherein the third database is a primary database for the third application and a backup database for the first application, wherein the fourth database is a primary database for the fourth application and a backup database for the second application, wherein the first application interacts with its respective databases through the first replication driver, wherein the second application interacts with its respective databases through the second replication driver, wherein the third application interacts with its respective databases through the third replication driver, and wherein the fourth application interacts with its respective databases through the fourth replication driver.

13. The system of claim 12, wherein the first and second replication drivers are configured to interact with the first fault manager, the third and fourth replication drivers are configured to interact with the second fault manager, and the replication drivers are further configured to interact with a replayer and a logger.

14. The system of claim 12, wherein the first fault manager is configured to detect failure of the first application or the second application, and the second fault manager is configured to detect failure of the third application or the fourth application.

15. The system of claim 12, further comprising a logger and a log file, wherein the logger is configured to record transactions in a log file when a database is unavailable.

16. A computer-implemented method comprising:
operating a replication driver implementing an application programming interface (API) of a database driver;
the replication driver intercepting a put transaction directed to the database driver and committing the transaction to a target database and a backup database of the target database when both the target database and the backup database are available;
a first transaction logger recording the transaction to a file;
maintaining communication between the first transaction logger and a second transaction logger independent of the availability of the target database and the backup database; and
when one of the target database and the backup database is determined to be an unavailable database, the replication driver recording the transaction in the file as a result of the determination, and when communication fails between the transaction loggers, the second transaction logger recording put transactions to the file when one of the target database and the backup database is an unavailable database.

17. The method of claim 16 further comprising:
the replication driver intercepting queries directed to the database driver and redirecting the queries to the backup database when the target database is unavailable.

18. The method of claim 16 further comprising:
the replication driver maintaining periodic communication with the target and backup databases;
the replication driver communicating database unavailability to a fault manager; the fault manager communicating the database unavailability to other replication drivers.

19. The method of claim 16 further comprising:
when the unavailable database becomes an available database, reading logged transactions from the file and committing the logged transactions to the available database.

20. The method of claim 16 further comprising:
the backup database being a remote database.

* * * * *